United States Patent
Braasch et al.

(10) Patent No.: US 6,996,494 B2
(45) Date of Patent: Feb. 7, 2006

(54) POSITION MEASURING DEVICE AND A METHOD FOR OPERATING A POSITION MEASURING DEVICE

(75) Inventors: Jan Braasch, Trostberg (DE); Hermann Hofbauer, Trostberg (DE); Rudolf Mittmann, Tacherting (DE); Erich Strasser, Trostberg (DE); Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 7 days.

(21) Appl. No.: 10/398,950

(22) PCT Filed: Oct. 10, 2001

(86) PCT No.: PCT/EP01/11688

§ 371 (c)(1),
(2), (4) Date: Sep. 26, 2003

(87) PCT Pub. No.: WO02/31444

PCT Pub. Date: Apr. 18, 2002

(65) Prior Publication Data

US 2004/0133373 A1 Jul. 8, 2004

(30) Foreign Application Priority Data

Oct. 12, 2000 (DE) .......................................... 100 50 392

(51) Int. Cl.
*G06F 15/00* (2006.01)

(52) U.S. Cl. ..................................................... 702/150

(58) Field of Classification Search .................... 702/94, 702/95, 150–153, 155, 158, 161, 189; 341/11, 341/13, 110, 111, 122, 126
See application file for complete search history.

(56) References Cited

U.S. PATENT DOCUMENTS

| 5,241,173 A | 8/1993 | Howley et al. | ......... 250/231.16 |
| 5,252,825 A | 10/1993 | Imai et al. | ............. 250/231.18 |

(Continued)

FOREIGN PATENT DOCUMENTS

| DE | 41 23 722 A1 | 1/1992 |
| DE | 41 25 865 A1 | 2/1993 |

(Continued)

OTHER PUBLICATIONS

Patent Abstracts of Japan document regarding Japanese publication 2–36313 A, published by Japanese Patent Office, 1990, one page.

(Continued)

*Primary Examiner*—Michael Nghiem
(74) *Attorney, Agent, or Firm*—Brinks Hofer Gilson & Lione

(57) ABSTRACT

A position measuring device having a scanning element assigned to a periodic measuring graduation, the scanning element moves relative to the measuring graduation so as to scan the measuring graduation and generates a first analog signal and a second analog signal that is phase shifted relative to the first analog signal. A module that forms a measured position value, wherein the first and second analog signals are present at the module, and a code word defines a position that is present at an output of the module. An output module that digitally outputs the code word over a data channel and a conversion device that converts the first analog signal and the second analog signal into multi-digit amplitude-proportional code words, wherein the code words are also available at the output module for outputting on the data channel and is digitally transmitted by the output module over the data channel.

13 Claims, 3 Drawing Sheets

U.S. PATENT DOCUMENTS

| | | | |
|---|---|---|---|
| 5,406,077 A * | 4/1995 | Aoki et al. | 250/231.18 |
| 5,677,686 A | 10/1997 | Kachi et al. | 341/11 |
| 5,687,103 A | 11/1997 | Hagl et al. | 702/150 |
| 5,760,707 A | 6/1998 | Katagiri | 340/870.1 |
| 5,973,620 A | 10/1999 | Holzapfel et al. | 341/11 |
| 6,424,143 B1 | 7/2002 | Blossfeld et al. | 324/160 |
| 6,542,847 B1 | 4/2003 | Lohberg et al. | 702/148 |

FOREIGN PATENT DOCUMENTS

| | | |
|---|---|---|
| DE | 44 22 056 A1 | 1/1995 |
| DE | 43 42 377 A1 | 6/1995 |
| DE | 195 02 399 A1 | 10/1995 |
| DE | 195 08 834 C2 | 12/1996 |
| DE | 199 11 774 A1 | 12/1999 |
| DE | 101 04 373 * | 6/2004 |
| EP | 0 514 081 A1 | 11/1992 |
| EP | 0 660 209 A1 | 6/1995 |
| EP | 0 836 080 A1 | 4/1998 |
| EP | 0 707 384 B1 | 10/1999 |
| EP | 0 962 748 A1 | 12/1999 |
| JP | 2-36313 A | 2/1990 |
| JP | 8-29197 A | 2/1996 |
| WO | WO 90/02956 | 3/1990 |

OTHER PUBLICATIONS

Patent Abstracts of Japan document regarding Japanese publication 8–29197 A, published by Japanese Patent Office, 1996, one page.

* cited by examiner

POSITION MEASURING DEVICE AND A METHOD FOR OPERATING A POSITION MEASURING DEVICE

Applicants claim, under 35 U.S.C. §§ 120 and 365, the benefit of priority of the filing date of Oct. 10, 2001 of a Patent Cooperation Treaty patent application, copy attached, Ser. No. PCT/EP01/11688, filed on the aforementioned date, the entire contents of which are incorporated herein by reference, wherein Patent Cooperation Treaty patent application Ser. No. PCT/EP01/11688 was not published under PCT Article 21(2) in English.

Applicants claim, under 35 U.S.C. § 119, the benefit of priority of the filing date of Oct. 12, 2000 of a German patent application, copy attached, Ser. No. 100 50 392.6, filed on the aforementioned date, the entire contents of which are incorporated herein by reference.

BACKGROUND OF THE INVENTION

1. Field of the Invention

The present invention relates to a position measuring device, and to a method for operating a position measuring device.

2. Description of the Related Art

A differentiation is made in connection with position measuring devices between incremental and absolute position measuring devices. With incremental position measuring devices, two analog or rectangular scanning signals, which are offset from each other by 90°, are present at the output, from which a measured position value is only formed in a follow-up electronic device. With absolute position measuring devices, an absolute measured position value is already present at the output and can be provided to a follow-up electronic device.

With both categories of position measuring devices, the dependability and functional status depends on the quality of the scanning signals. It is possible in connection with incremental position measuring devices which output analog scanning signals to directly test the quality of the scanning signals in that these are supplied to both channels of a dual-trace oscilloscope, so that a Lissajous figure is generated on the screen. The radius of the Lissajous figure is a measurement of the amplitudes, as well as the phase relationship of both scanning signals. This procedure is described in WO 90/02956 A1 and JP 02 036313 A.

A direct measurement is not possible with incremental position measuring devices, which issue two rectangular scanning signals which are phase-shifted by 90° with respect to each other. In JP 08 029197 A it is proposed to provide a selector switch in the position measuring device, so that either the rectangular scanning signals, or the analog scanning signals which are phase-shifted by 90° with respect to each other, can be output on two data lines. During measuring operations the rectangular scanning signals are transmitted, and the analog scanning signals for error diagnosis.

In accordance with EP 0 962 748 A1 and DE 199 11 774 A1, status information of the position measuring device is transmitted analogously superimposed on the incremental rectangular scanning signals. In this case the decoding of the superimposed signals is relatively difficult.

Absolute position measuring devices are described in DE 44 22 056 A1 and DE 43 42 377 A1. In accordance with DE 44 22 056 A1, several scanning signals of a periodic measuring graduation, which are phase-shifted with respect to each other, are provided to a counter for creating an absolute position. This absolute position is bit-serially transmitted by the position measuring device as a multi-digit code word to an electronic follow-up device on a data line. Monitoring circuits are additionally provided in the position measuring device which detect the functional status of the position measuring device and, as a function of this, provide abnormality information via the data line. The temperature and the voltage supply are here cited as monitoring options.

In accordance with DE 43 42 377 A1, besides the absolute position, alarm and warning reports are also serially transmitted on a data line to an electronic follow-up device. Monitoring of the functional status takes place in the position measuring device.

SUMMARY AND OBJECTS OF THE INVENTION

It is an object of the present invention to disclose a position measuring device wherein, on the one hand, position information is present at the output, and in addition the position measuring device also makes information available by which the functional status of the position measuring device can be determined in a simple manner.

This object is attained by a position measuring device having a scanning element assigned to a periodic measuring graduation, the scanning element moves relative to the measuring graduation so as to scan the measuring graduation and generates a first analog signal and a second analog signal that is phase shifted relative to the first analog signal. A module that forms a measured position value, wherein the first and second analog signals are present at the module, and a code word defines a position that is present at an output of the module. An output module that digitally outputs the code word over a data channel and a conversion device that converts the first analog signal and the second analog signal into multi-digit amplitude-proportional code words, wherein the code words are also available at the output module for outputting on the data channel and is digitally transmitted by the output module over the data channel.

The advantages of this position measuring device lie in that information regarding the position and the functional status can be transmitted over a common data line, or data channel Moreover, the exclusively digital transmission assures a high degree of freedom from interface, and the interface modules can be produced in a cost-effective manner.

It is a further object of the present invention to disclose a method for operating a position measuring device, by which measured position values, as well as data, can be transmitted from the position measuring device to an electronic follow-up device, by which it is possible to make statements regarding the functional status of the position measuring device.

This object is attained by a method for operating a position measuring device that includes scanning a periodic measuring graduation and generating a first position-dependent scanning signal and a second position-dependent scanning signal that is phase-shifted relative to the first position-dependent scanning signal. Forming a measured position value from the first position-dependent scanning signal and the second position-dependent scanning signal and transmitting the measured position value as a code word to an electronic follow-up device over a data channel, wherein the code word defines a position. Converting the first position-dependent scanning signal and the second position-dependent scanning signal into multi-digit amplitude-proportional code words and transmitting the multi-digit amplitude-proportional code words to the electronic follow-up device via the data channel.

The great advantage of this method lies in that only one data channel is required, over which the absolute position, as well as data regarding the functional status, can be transmitted. The evaluation of the data indicating the functional status can be performed through simple and customary arrangements. Changes in the status of the position measuring device can be detected, so that countermeasures can be taken in good time prior to a functional failure.

Advantageous embodiments of the present invention will be explained in greater detail by the drawing figures. Shown are in:

DESCRIPTION OF THE PREFERRED EMBODIMENT(S) OF THE INVENTION

The absolute position measuring device 100 including a known manner for example of a scale 1 with several measuring graduations 2, 3, 4. The measuring graduations 2 and 3 are periodic graduations with different graduation periods, and the measuring graduation 4 is a non-periodic graduation, also called pseudo random code. Such a position measuring device is described in DE 41 23 722 A1.

Figure 1:
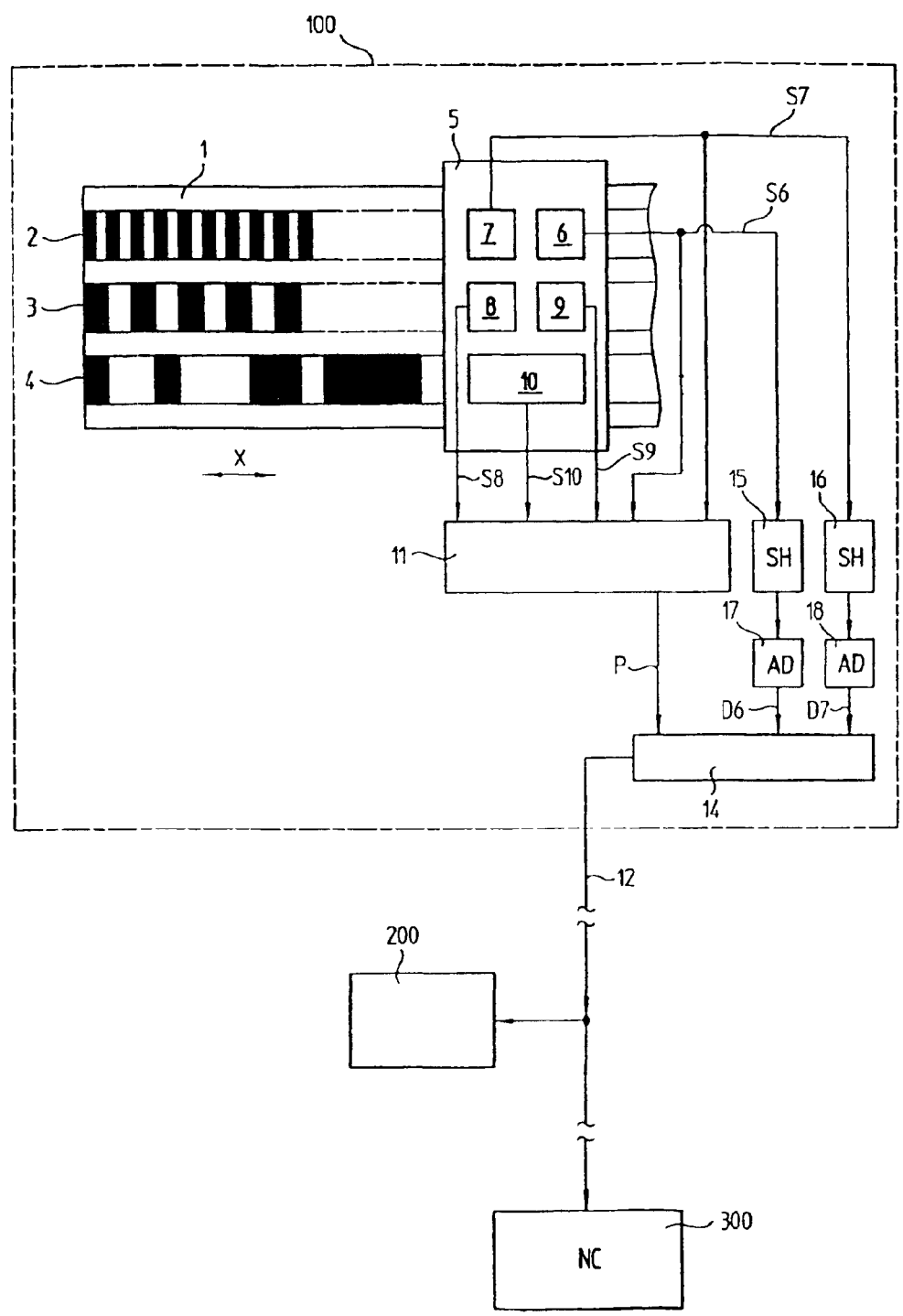
FIG. 1 schematically shows an embodiment of a position measuring device in accordance with the present invention.

The measuring graduations 2, 3, 4 are scanned by a common scanning head 5. The scanning head 5 contains scanning elements 6 to 10 for scanning the measuring graduations 2 to 4. The scanning elements 6 and 7 are assigned to the finest periodic measuring graduation 2 and each generates a sinusoidal analog scanning signal S6, S7 on its output, wherein the scanning signals S6 and S7 are phase-shifted by 90° in relation to each other. The periodic measuring graduation 3 is also scanned by scanning elements 8, 9 for the generation of two scanning signals S8 and S9, phase-shifted by 90° in relation to each other. The measuring graduation 4 is scanned by a diode line 10, wherein each line element emits an output signal. Only one line is schematically represented in FIG. 1 for these scanning signals S10.

The scanning signals S6 to S10 are conducted to a module 11 for forming an absolute position P. The module 11 can be a logic circuit or a microprocessor, in which the scanning signals S6 to S10 are combined in a known manner into an absolute position, so that a multi-digit code word $P_{cw}$ representing the absolute position P is present at the output, which defines the measured position value. This code word $P_{cw}$ representing the absolute position P is transmitted bit-serially on a data channel 12 to an electronic follow-up device, for example a control 300 of a numerical control (NC) machine. An output module 14—also called interface module or driver is provided for this purpose. Preferably the position measuring device 100 is assigned to a movable element—in particularly directly to an electrical drive mechanism—of a machine tool, and the electronic follow-up device is a control 300 of an NC machine.

Alternatively the scale 1 can also only have several periodic measuring graduations in accordance with DE 41 25 865 A1, wherein the measured position value is constituted by a logical linkage of scanning signals of all periodic measuring graduations. However, the scale 1 can also only have a single periodic measuring graduation in accordance with DE 44 22 056 A1, wherein the absolute position is formed in the position measuring device from a directionally-dependent counting of pulses, derived from several scanning signals, which are phase-shifted with respect to each other.

In accordance with the present invention, amplitude values of the two scanning signals S6 and S7 can be transmitted in digital form as multi-digit code words D6 and D7, each having a bit width of at least 4 bits in particular, but preferably at least 8 bits, over the same data channel 12 over which the code word $P_{cw}$ for the absolute position can be transmitted. For this purpose the instantaneous amplitudes of the analog scanning signals S6 and S7 are picked up at identical times by sample memories or hold members 15 and 16. These picked-up analog values are each converted into amplitude—proportional digital code words D6 and D7, for which analog-digital digital converters 17 and 18 are schematically represented in FIG. 1. The amplitude-proportional code words D6 and D7 are present at the output module 14, so that they can also be serially transmitted over the data channel 12.

Because of these steps, the data required for determining the functional status of the position measuring device 100 are now available on the data channel 12. A check can now be performed whether the relative phase-shifted scanning signals $S6=SA6^*\sin\omega t$ and $S7=SA7^*\cos\omega t$ are exactly phase-shifted by the set point phase position $\phi=90°$ in relation to each other, have the required signal amplitude, and whether the signal amplitudes SA6, SA7 of both scanning signals S6, S7 are identical. On the basis of these parameters it is possible to determine whether the scanning distance (distance between the scale 1 and the measuring head 5) has been set correctly, whether the scale I is soiled, or whether the scanning head 5 is twisted with respect to the scale (Moire angle).

A diagnostic device 200 is connected with the data channel 12 for developing and representing the functional status of the position measuring device.

Figure 2:
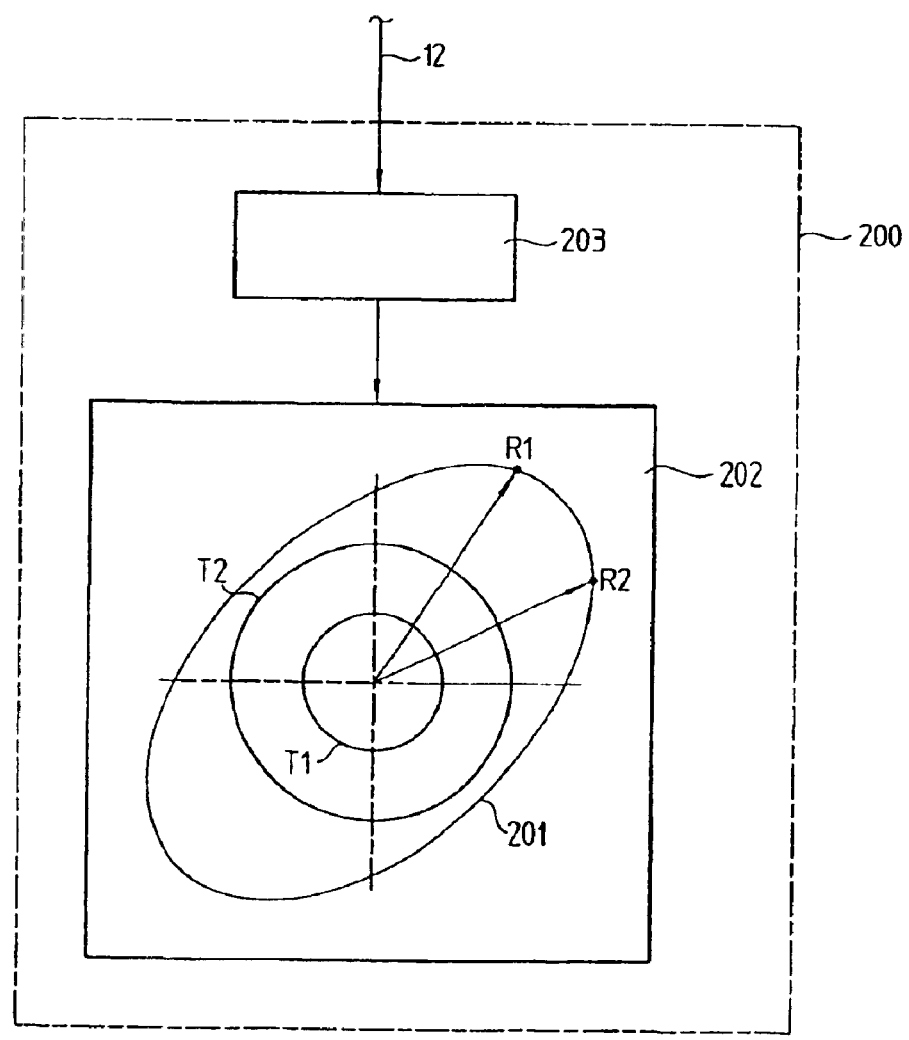
FIG. 2 schematically shows an embodiment of a diagnostic device of the position measuring device of FIG. 1 in accordance with the present invention.

The radius $R=\sqrt{S6^2+S7^2}$ is determined from a value pair D6, D7 of the scanning signals S6, S7, each of which were picked up at the same time. Successive value pairs provide a sequence of radius values R, which form a Lissajous FIG. 201. This Lissajous FIG. 201, which is the result of successively determined radius values R, is represented on a display screen 202. Only two radius values R1, R2 of the Lissajous FIG. 201 are represented in FIG. 2. In place of the Lissajous FIG. 201, a bar display in accordance with WO 90/02956 A1 or EP 0 836 080 A1 is also possible.

For displaying the picked-up scanning signals S6, S7, the code words D6, D7, or the standardized code value D6', D7', which will be described in greater detail later, can be digitally-analogously converted in the diagnostic device 200 and represented in a known manner as a Lissajous figure. This representation is particularly advantageous, since the quality of the scanning signals S6, S7 can be judged in accordance with the individual requirements. If this is not required to this extent, the diagnostic device 200 can make an evaluation on its own or additionally, and can correspondingly issue warning or alarm reports if predetermined criteria for the scanning signals S6, S7 are no longer met.

For performing an evaluation of the functional status in a particularly simple manner, a set point N for the amplitudes SA6 and SA7 is stored in the position measuring device 100. This has the advantage that a standardization of the output code words D6, D7 which is independent of the device can take place in the measuring device 100 in that the actual amplitudes of the scanning signals S6, S7, or D6, D7 are put in a direct correlation with the set point amplitude N:

$$S6/N=S6'$$

$$S7/N=S7'$$

Then the standardized amplitude values S6' and S7' are transmitted over the data channel 12 in the form of amplitude—proportional code words D6', D7'. Because of this, the diagnostic device 200 can be designed uniformly for a multitude of different position measuring devices 100 and independent of the respective devices. It is possible to preset and display tolerance limits T1, T2 independently of device-specific absolute amplitudes of the scanning signals S6, S7.

Alternatively to this it is also possible to transmit the set point value N stored in the position measuring device to the diagnostic device 200 as a digital value and to perform standardization in the diagnostic device 200.

The preset tolerance limits T1, T2 can also be stored in the position measuring device 100 and can be transmitted as digital values to the diagnostic device 200 over the data channel 12.

The diagnostic device 200 can also be an integral component of the control 300 of an NC machine, in which case the display screen 202 preferably is the display screen of the control of the NC machine.

Dependable transmission is assured because of the digital data transmission since it is also possible to test the transmission of the amplitude-proportional code words D6, D7 by forming and transmitting a CRC (cyclic redundancy check).

Figure 3:
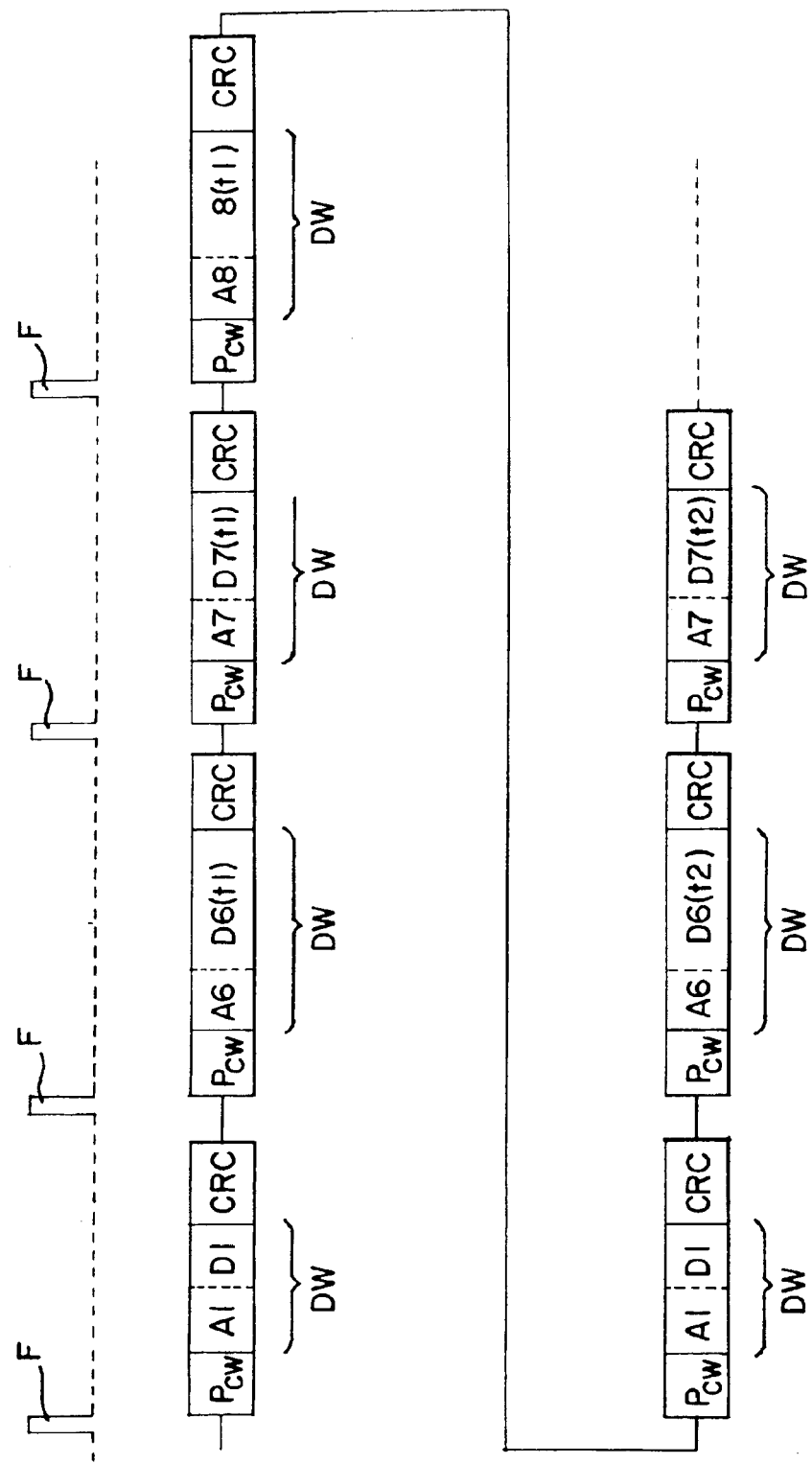
FIG. 3 shows an embodiment of a protocol for a data transmission to be used with the position measuring device of FIG. 1 in accordance with the present invention.

A protocol for the signal transmission is schematically represented in FIG. 3. An absolute measured position value P is requested by the electronic follow-up device–control 300—by a command F. This request can take place via a separate signal line or via the bi-directionally designed data channel 12. For synchronizing the data transmission between the position measuring device 100 and the electronic follow-up device 300, a synchronously serial transmission is advantageously provided, wherein in a known manner a timing pulse line, not represented, is arranged between the position measuring device 100 and the electronic follow-up device 300 for transmitting the transmission clock rate from the electronic follow-up device 300 to the position measuring device 100.

Based on this command F, the position measuring device 100 transmits a data package that includes a measured position value as a code word P and diagnostic information DW, diagnostic information DW is advantageously composed of a block having an address A and associated data D. To increase the transmission dependability, a check information—also called CRC—is formed from the measured position value P and the diagnostic information DW and is transmitted in the data package.

In the example represented, the diagnostic information only includes an address A and associated data D. However, the data package can also contain several addresses and/or data.

One address A1 can determine the type of diagnostic operation, wherein the succeeding data D1 are a list of the contents and sequence of the diagnostic information transmitted in the subsequent protocol. Further addresses characterize diagnostic values, for example the address A6 defines the subsequent transmission of the amplitude-proportional code word D6 of the scanning signal S6.

Following a further request F and the transmission of an actualized measured position value P, the amplitude-proportional code word D7 of the scanning signal S7, which is defined by the address A7, is transmitted. The two code words D6, D7 were derived from amplitude values of the two scanning signals S6, S7 picked up at the same time (time t1).

In the course of subsequent requests F, further diagnostic values, such as the code word connection quality D8 in the form of an assessed number (determined in accordance with EP 0 707 384 B1), or the temperature, can be transmitted in addition to the measured position value P by associated addresses A8. Once all diagnostic values associated with a time t1 and required for a valid diagnosis have been transmitted, a further value pair of the scanning signals S6, S7 in the form of amplitude—proportional code words D6, D7 is transmitted in the same form. The code words D6, D7 transmitted at that time are also derived from amplitude values of the two scanning signals S6, S7 picked up at the same time (time t2).

The diagnostic information DW can also be transmitted in partial blocks, for example with a first measured position value P the address with only a portion of the code word D6, and with a second measured position value P a further address with the remainder of the code word D6. In the same way it is also possible to transmit with a measured position value P only the address, and with the next measured position value P the associated data.

The data flow of diagnostic information DW which is associated with a common time t1, t2, is advantageously delimited by a start information and an end information. In the example represented, this start or end information is the address A1 with the data D1. The data D6 (t1), D7 (t1), D8 (t1), which had been picked up at a common time ti and stored in the position measuring device 100, are contained between these pieces of information DW.

The data transmission over the data channel 12 can take place synchronously and serially, or asynchronously.

The data protocol represented has the advantage that the status control of the position measuring device 100 is possible online, i.e. also with the control 300 of an NC machine connected and operating. The diagnostic device 200 is connected upstream of the control 300 of the NC machine and, because the method of addressing of the incoming data flow, filters the data D6 and D7 out for diagnosis. For this purpose the filter 203 is schematically represented in FIG. 2. The data in the form of codeword $P_{cw}$ required for regulating the control 300 of the NC machine reach the control 300 of the NC machine. Thus, the diagnostic device 200 only listens in, so to speak.

Alternatively to the mode of operation represented, in one mode of operation the position measuring device 100 could transmit only absolute measured position values P, and in another mode of operation only diagnostic values with the value pairs of the scanning signals D6, D7 bit-serially over the serial data channel. Thus the position measuring device 100 can be switched between measuring operation and diagnostic operation. This switching can be performed by the diagnostic device 200 or the control 300 via the data channel 12, which is capable of functioning bi-directionally.

It is particularly advantageous if the instantaneous values of the scanning signals S6, S7 from the measuring graduation 2 with the smallest graduation period are used for the diagnosis of the position measuring device 100. However, it is also possible to output the instantaneous values of other measuring graduation tracks, or additionally the instantaneous values of further measuring graduation tracks 3 serially over the data channel 12.

The scanning signals S6, S7 to be monitored, which are phase-shifted with respect to each other, do not necessarily have to be derived from a single measuring graduation. They can also be derived from two separate measuring graduations, which are arranged spaced apart from each other and transversely to the measuring direction X. The set point value of the scanning signals S6, S7 which are phase-shifted with respect to each other is not limited to 90°, thus it is also possible, for example, to use amplitude-proportional code words from two or three scanning signals, which are phase-shifted with respect to each other by respectively 120°. The measuring graduations can be designed so they can be scanned opto-electrically, magnetically, inductively or capacitively. The position measuring device can be designed for linear or rotary position measurement.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

What is claimed is:

1. A position measuring device comprising:
    a scanning element assigned to a periodic measuring graduation, said scanning element moves relative to said measuring graduation so as to scan said measuring graduation and generates a first analog signal and a second analog signal that is phase shifted relative to said first analog signal;
    a module that forms a measured position value, wherein said first and second analog signals are present at said module, and a code word defines a position that is present at an output of said module;
    an output module that digitally outputs said code word over a data channel; and
    a conversion device that converts said first analog signal and said second analog signal into multi-digit amplitude-proportional code words, wherein said code words are also available at said output module for outputting on said data channel and is digitally transmitted by said output module over said data channel.

2. The position measuring device in accordance with claim 1, further comprising a memory connected upstream of said output module, in which an amplitude value of said first analog scanning signal picked up at a first time, and an amplitude value of said second analog scanning signal that was picked up at said first time, are stored.

3. A method for operating a position measuring device, comprising:
    scanning a periodic measuring graduation;
    generating a first position-dependent scanning signal and a second position-dependent scanning signal that is phase-shifted relative to said first position-dependent scanning signal;
    forming a measured position value from said first position-dependent scanning signal and said second position-dependent scanning signal;
    transmitting said measured position value as a code word to an electronic follow-up device over a data channel, wherein said code word defines a position;
    converting said first position-dependent scanning signal and said second position-dependent scanning signal into multi-digit amplitude-proportional code words; and
    transmitting said multi-digit amplitude-proportional code words to said electronic follow-up device via said data channel.

4. The method in accordance with claim 3, wherein said multi-digit amplitude-proportional code words are derived from isochronous instantaneous values of two periodic scanning signals $S6=SA6^* \sin \omega t$ and $S7=SA7^* \cos \omega t$.

5. The method in accordance with claim 3, further comprising standardizing said multi-digit amplitude-proportional code words in that instantaneous values of said first and second position-dependent scanning signals are related to a standard factor.

6. The method in accordance with claim 3, further comprising:
    requesting said code word by said electronic follow-up device; and
    transmitting said code word and at least a portion of said multi-digit amplitude-proportional code words over said data channel.

7. The method in accordance with claim 3, further comprising:
    assigning an address to each of said multi-digit amplitude-proportional code words.

8. The method in accordance with claim 3, further comprising supplying said multi-digit amplitude-proportional code words to a diagnostic device.

9. The method in accordance with claim 8, further comprising forming and displaying values for phase position of said first and second position-dependent signals from said multi-digit amplitude-proportional code words.

10. The method in accordance with claim 8, further comprising forming and displaying values for amplitude height of said first and second position-dependent signals from said multi-digit amplitude-proportional code words.

11. The method in accordance with claim 3, further comprising bit-serially transmitting said code word and said multi-digit amplitude-proportional code words on said data channel.

12. A position measuring device comprising:
    a scanning element that generates a first scanning signal and a second scanning signal that is phase shifted relative to said first scanning signal;
    a module that forms a measured position value, wherein said first and second scanning signals are present at said module, and a code word defines a position that is present at an output of said module;
    an output module that digitally outputs said code word over a data channel; and
    a device that generates, based on said first scanning signal and said second scanning signal, at least a multi-digit code word that defines a status of amplitudes of said first and second scanning signals, wherein said multi-digit code word is also available at said output module for outputting on said data channel and is digitally transmitted by said output module over said data channel.

13. A method for operating a position measuring device, comprising:
    generating a first position-dependent scanning signal and a second position-dependent scanning signal that is phase-shifted relative to said first position-dependent scanning signal;

forming a measured position value from said first position-dependent scanning signal and said second position-dependent scanning signal;

transmitting said measured position value as a code word to an electronic follow-up device over a data channel, wherein said code word defines a position;

generating, based on said first position-dependent scanning signal and said second position-dependent scanning signal, at least a multi-digit code word that defines a status of amplitudes of said first and second position-dependent scanning signals; and transmitting said multi-digit code word to said electronic follow-up device via said data channel.

* * * * *